United States Patent [19]

Miyazaki et al.

[11] 4,451,311

[45] May 29, 1984

[54] METHOD FOR MANUFACTURING A DAMPENING ROLL COVER

[75] Inventors: Tadashi Miyazaki, Showa; Takao Hasegawa, Kuki, both of Japan

[73] Assignee: Firma Carl Freudenberg, Weinheim, Fed. Rep. of Germany

[21] Appl. No.: 356,265

[22] Filed: Mar. 9, 1982

[30] Foreign Application Priority Data

Mar. 27, 1981 [JP] Japan .................................. 56-46080

[51] Int. Cl.³ .............................................. B29C 27/20
[52] U.S. Cl. ...................................... 156/86; 264/230; 264/342 R
[58] Field of Search .................... 156/85, 86; 264/230, 264/342 R

[56] References Cited

U.S. PATENT DOCUMENTS

| | | | |
|---|---|---|---|
| 2,474,375 | 6/1949 | Shearer et al. | 156/86 |
| 3,183,578 | 5/1965 | Kennedy | 156/86 |
| 3,273,224 | 9/1966 | Spicer | 156/86 |
| 3,293,097 | 12/1966 | Peterson et al. | 264/342 R |
| 3,466,210 | 9/1969 | Wareham | 264/230 |
| 3,926,701 | 12/1975 | Nishiwaki | 156/86 |

*Primary Examiner*—Caleb Weston
*Attorney, Agent, or Firm*—Kenyon & Kenyon

[57] ABSTRACT

The present invention is directed to a method for manufacturing a dampening roll cover useful in a flat-bed printing process, comprised of hygro-thermally shrinkable fibers which do not shrink due to exposure to ambient mositure during storage. Such dampening roll covers are prepared by preliminarily shrinking a cylinder of a fibrous fleece comprised of hygro-thermally shrinkable fibers to the extent of about 3% to about 50% in length to compact the fibrous structure of the cylinder.

12 Claims, No Drawings

METHOD FOR MANUFACTURING A DAMPENING ROLL COVER

FIELD OF THE INVENTION

The present invention relates to a dampening roll cover used in a flat-bed printing process. More specifically, the present invention relates to a dampening roll cover mounted on the surface of a dampening roll by means of which water stored in a water tank or the like, is fed onto the surface of a flat-bed during a flat-bed printing process.

BACKGROUND OF THE INVENTION

Dampening roll covers using knit sleeves are known in the art. In the case of a dampening roll having a dampening roll cover consisting of knit sleeves mounted on the dampening roll mandrel, the knit sleeves have been bound to the dampening roll mandrel by means of strings or the like, located at both ends of the mandrel. However, it is a troublesome job to mount knit sleeves in this manner. In addition, there is the associated danger that the strings or the like may loosen during use, thereby allowing the dampening roll cover to slip out of position.

Non-woven sleeves disclosed in Japanese Patent Publication No. 26007/1972 are manufactured by applying water to a previously fabricated non-woven cylinder comprised of hydrophilic fibers in order to increase the diameter of the fibers. This is followed by the step of drying the fibers when they are in this expanded condition. Thus, a dampening roll cover consisting of non-woven sleeves loosely mounted on the dampening roll mandrel is shrunken through the application of water, and in this manner the non-woven sleeves are firmly mounted on the mandrel. Thus, the troublesome job of binding the cover to the mandrel by means of strings or the like located at both ends of the mandrel is not required when the above-described non-woven sleeves are employed. Further, there is no danger that the cover will slip out of position during use.

It is, however, troublesome to fabricate a dampening roll cover consisting of non-woven sleeves of this type because the step of expanding the non-woven cylinder is required. According to Japanese Patent Publication No. 26007/1972, the expansion of the non-woven cylinder is done manually and, hence, the fabrication of a dampening roll cover from non-woven sleeves is troublesome. Furthermore, such an expansion method gives rise to the following defect in the resulting dampening roll cover: during storage the dampening roll cover contacts moisture in the atmosphere and the hydrophilic fibers of the cover are expanded by this moisture. Hence, the shrinkage of the cover, necessary to firmly mount the cover on the mandrel, occurs prematurely during storage due to contact with atmospheric moisture and the dampening roll cover cannot be mounted on the mandrel.

SUMMARY OF THE INVENTION

It is an object of the present invention to provide a simple method for manufacturing a dampening roll cover which does not shrink even though it contacts moisture in the atmosphere during storage.

In accordance with the foregoing objective, the present invention provides a method for manufacturing a dampening roll cover which shrinks radially when subjected to the action of hot water, comprised of previously shrunken hygro-thermally shrinkable fibers which have the capacity to shrink further by at least about 10%, which comprises:

(a) forming a fibrous fleece comprised of hygro-thermally shrinkable fibers;

(b) forming a cylinder from said fibrous fleece of hygro-thermally shrinkable fibers;

(c) feeding binder among the hygro-thermally shrinkable fibers comprising the fibrous fleece;

(d) and preliminarily shrinking the hygro-thermally shrinkable fibers comprising the cylinder of fibrous fleece by about 3% to about 50% to compact the fibrous structure of said cylinder of fibrous fleece.

DETAILED DESCRIPTION OF THE PRESENT INVENTION

The hygro-thermally shrinkable fibers used in the present invention are fibers that shrink by the action of hot water of about 40° C. to about 80° C. The hygro-thermally shrinkable fibers used in the present invention require a coefficient of complete shrinkage of at least about 12.7%. The reason for this requirement is that a shrinkage of at least about 3% is necessary for a preliminary shrinkage step discussed in greater detail below, and a shrinkage of about 10% is necessary for the step of mounting the preliminarily shrunken cover on the mandrel. The degree of shrinkage (i.e. coefficient of shrinkage in %) as that term is employed herein is calculated by the following equation:

$$(l - l')/l \times 100$$

wherein $l$ is the length of fibers prior to shrinkage, and $l'$ is the length of fibers after shrinkage.

In the first step of this method a fibrous fleece is formed from the above-described hygro-thermal fibers. Specific examples of suitable hygro-thermally shrinkable fibers include polyvinylalcohol fiber, polyamide fiber, acrylic fiber and the like—for example, hygro-thermally shrinkable polyvinylalcohol fibers of about 1.5 denier, and about 38 mm. long.

Although the fibrous fleece mainly consists of hygro-thermally shrinkable fibers, other fibers such as rayon fiber, cotton fiber, wool fiber, acrylonitrile fiber or the like may be added to the hygro-thermally shrinkable fibers in the amount of about 40% by weight. For example, a suitable fibrous fleece may be comprised of about 70% by weight hygro-thermally shrinkable fibers and about 30% of another fiber, e.g., 70% by weight of hygro-thermally shrinkable polyvinylalcohol fibers of about 1.5 denier and a 38 mm. length, and about 30% by weight of rayon fibers of 1.5 denier and 57 mm. length.

The fibrous fleece can be fabricated by opening and accumulating the hygro-thermally shrinkable fibers according to a carding method, an air-laying method, a paper-manufacturing method or the like. In particular, a fibrous fleece in which the hygro-thermally shrinkable fibers are orientated in one direction such as that obtained using flat cards, is preferably employed in the present method. The reason for this is that in this manner a cylinder of fibrous fleece can be obtained in which the hygro-thermally shrinkable fibers are orientated in a circumferential direction, thereby a large degree of shrinkage can be attained during the preliminary shrinkage of the mandrel cover, as well as during mounting of the cylinder of fibrous fleece on the mandrel.

The resulting fibrous fleece is wound around a cylindrical object to form a cylinder of the fibrous fleece. Flat-winding, gaiter-winding or another winding method may be employed for this purpose. The number of windings may be suitably determined and adjusted as a function of the thickness of the fibrous fleece being employed.

A binder is fed among the hygro-thermally shrinkable fibers in order to reinforce the fibrous fleece. It should be noted that the binder may be fed among the hygro-thermally shrinkable fibers either after they are wound to form the cylinder of fibrous fleece, or before they are wound to form the cylinder of fibrous fleece. In addition, the binder may be fed among said hygro-thermally shrinkable fibers during the process of fabricating the fibrous fleece cylinder.

Various types of known binders may be employed as the binder component of the invention including: polyvinylalcohol resin, acrylic resin, acrylic ester resin, polyamide resin, S B R, N B R or the like. Although the binder must be desiccated, in the event that it is employed in the form of an aqueous solution or emulsion, drying or desiccation should be performed at low temperatures in order to avoid the danger that the hygro-thermally shrinkable fibers which comprise the fibrous fleece will shrink when heated. However, complete desiccation is not required because residual water can be used as moisture for the preliminary shrinkage step. It goes without saying that drying or desiccation need not be performed at low temperatures in the event that the binder is applied in the form of a solvent solution of the binder or in the form of solid binder.

The resulting cylinder of fibrous fleece formed as a unit together with the binder is maintained under hygro-thermal conditions to preliminarily shrink the hygro-thermally shrinkable fibers. This may be accomplished by placing the cylinder in a warm amd humid atmosphere, i.e., an atmosphere of 50% humidity and 50° C. In this manner the fibrous structure of the cylinder is compacted in order to provide it with suitable capacity for water soaking as well as to provide it with sufficient abrasion resistance so that it is suitable for use as a dampening roll cover.

Although the degree of the preliminary shrinkage is dependent upon the type of hygro-thermally shrinkable fibers employed, as a rule a coefficient of shrinkage of about 3% to to about 50% is required. The reason for this is that a sufficiently compact structure in the cylinder of fibrous fleece cannot be attained in the case of a coefficient of shrinkage of 3% or less, and the fibrous structure of the cylinder of fibrous fleece is too compacted to be suitably used as a dampening roll cover in the case of a coefficient of shrinkage of 50% or more. Furthermore, in the case of a coefficient of shrinkage greater than 50%, "the shrinking power" for mounting the dampening roll cover on the mandrel is frequently decreased. Preferably, the hygro-thermally shrinkable fibers comprising the wound cylinder are shrunken to the extent of about 5% to about 25%. For a preliminary shrinkage of about 5% to about 25%, the degree of compactness of the resultant compact cylinder is suitable for the resulting dampening roll cover.

The following steps may also be performed in conjunction with the method of the present invention, i.e., a heat treatment is preferably carried out on the preliminarily shrunken cylinder under dry, high-temperature conditions in the event that a cross-linkable binder such as acrylic resin, S B R, N B R or the like is employed, because the binding effect can be improved through the cross-linking of the binder among the fibers. This heat treatment is preferably also employed in the event that readily soluble polyvinylalcohol fibers are employed as the hygro-thermally shrinkable fiber component, because polyvinylalcohol fibers are rendered difficultly soluble as a result of this heat treatment, and are thereby stabilized.

In addition, the present method preferably also includes the step of grinding the surface of the preliminarily shrunken dampening roll cover (e.g., through the use of a grinding roll or the like) in order to obtain a flat surface on the final dampening roll cover.

As described above in detail, the method of the present invention omits the step of expanding a cylinder consisting of fibrous fleece; that is, the present method is a simple and economical method of manufacturing a dampening roll cover. In addition, the dampening roll cover obtained according to the method of the present invention can be firmly mounted on the mandrel because the hygro-thermally shrinkable fibers comprising the dampening roll cover are not completly shrunken, but are shrunken only to the extent of about 3% to about 50%. Thus, the hygro-thermally shrinkable fibers of the dampening roll cover resultant from the present method can be shrunken further by at least about 10% or more, by the application of hot water after the dampening roll cover has been loosely mounted on said mandrel. The dampening roll cover obtained by the method of this invention can be stored for long periods of time because it does not shrink due to the absorption of atmospheric moisture.

The present invention will be described below by reference to the following detailed example.

EXAMPLE

A fibrous fleece consisting of 70% by weight polyvinylalcohol fibers of 1.5 denier and 38 mm. long, and 30% by weight of rayon fibers of 1.5 denier and 57 mm. long, is fabricated by means of a carding machine. The polyvinylalcohol fibers (hygro-thermally shrinkable fibers) are shrunken in water of 20° C. to the extent of 20% under a load-free condition, and then shrunken in water of 75° C. to the extent of 95% under a load-free condition.

Polyvinylalcohol resin is used as the resinous binder. A fibrous fleece soaked with an aqueous solution of polyvinylalcohol resin is transformed into a cylinder by means of flat-winding method. Then the resulting cylinder of fibrous fleece is dried in vacuum at ambient temperature, and in this manner the binder is solidified in order to control the shrinkage of the polyvinylalcohol fibers. The ratio of fibers to binder is adapted to be about 9:1 parts by weight on a dry-weight basis. The bulk-density of the resulting cylinder of fibrous fleece is about 0.1 g/cm$^3$.

During the preliminary shrinkage step the fibrous fleece cylinder obtained in the manner described above is stored in an atmosphere having a temperature of about 50° C. and about 50% humidity for about 4 hours to shrink the polyvinylalcohol fibers to the extent of about 10%. In this manner, the fibrous structure of the fibrous fleece cylinder is compacted. The bulk-density of the resulting cylinder of fibrous fleece is about 0.5 g/cm$^3$ which indicates that it is sufficiently compacted.

Then the resulting cylinder of fibrous fleece is subjected to a dry-heat treatment at 150° C. for 30 minutes, and as a result of this heat treatment, the polyvinylalcohol fibers and the polyvinylalcohol resin are rendered insoluble. Furthermore, the surface of the cylinder of fibrous fleece is flattened by means of grinding. Finally, the resulting cylinder of fibrous fleece is removed from the winding axis to provide the product, dampening roll cover.

The resultant dampening roll cover did not exhibit shrinkage of the polyvinylalcohol fibers despite exposure to the atmosphere extending over a long time period and, hence, did not exhibit a decrease in diameter during storage.

Hot water of 70° C. was applied to the dampening roll cover after it was loosely mounted on a mandrel. The polyvinylalcohol fibers were shrunken to the extent of about 20% or more, and as a result the dampening roll cover was firmly mounted to the mandrel. The dampening roll does not slip out of position, i.e., to the right or left while at work, and can be operated effectively because its cover is closely mounted on it.

This invention has been described in terms of specific embodiments set forth in detail herein. It should be understood that these are by way of illustration only and the invention is not necessarily limited thereto. Modifications will be apparent from the disclosure of this application and may be resorted to without departing from the spirit of the invention as those skilled in the art will readily understand. Accordingly, such variations and modifications of the disclosed embodiments are considered to be within the scope of this invention and the following claims.

We claim:

1. A method for manufacturing a dampening roll cover which shrinks radially when hot water is applied to it, said dampening roll cover being comprised of hygro-thermally shrinkable fibers which have been preliminarily shrunken, but which are capable of shrinking further to the extent of at least about 10%, comprising:
   a. forming a non-woven fibrous fleece comprised of hygro-thermally shrinkable fibers;
   b. forming a cylinder from said fibrous fleece;
   c. treating the hygro-thermally shrinkable fibers comprising said fibrous fleece with an aqueous solution of a crosslinkable binder;
   d. solidifying said binder at temperatures which will not shrink the fibers;
   e. partially shrinking the hygro-thermally shrinkable fibers of said cylinder by about 3% to about 50% by exposure to moisture to compact said cylinder of fibrous fleece; and
   f. subjecting the compact cylinder to dry heat sufficient to crosslink said binder.

2. The method according to claim 1 wherein said hygro-thermally shrinkable fibers shrink when treated with water at a temperature of about 40° to about 80° C.

3. The method according to claim 2 wherein said hygro-thermally shrinkable fiber is selected from the group consisting of polyvinylalcohol fiber, polyamide fiber and acrylic fiber.

4. The method according to claim 1 wherein said fibrous fleece is comprised of about 60% by weight of said hygro-thermally shrinkable fibers and about 40% by weight of a second fiber component.

5. The method according to claim 4 wherein said second fiber component is selected from the group consisting of rayon fiber, cotton fiber, wool fiber and acrylonitrile fiber.

6. The method according to claim 1 wherein said fibrous fleece is prepared by a carding method, and the shrinkable fibers of said cylinder are oriented in a circumferential direction.

7. The method according to claim 1 wherein the hygro-thermally shrinkable fibers of said cylinder of fibrous fleece are shrunken to the extent of about 5% to about 25%, to compact said cylinder.

8. The method according to claim 1 wherein the hygro-thermally shrinkable fibers comprising said cylinder of step (b) have a coefficient of complete shrinkage of at least about 12.7%.

9. The method according to claim 1 wherein said fibrous fleece comprises about 70% by weight polyvinylalcohol fibers which are hygro-thermally shrinkable and about 30% by weight rayon fibers, and said binder is resinous polyvinylalcohol, wherein the weight ratio of said fibers to binder is about 9:1 on a dry-weight basis, and the bulk density of said cylinder after said shrinking step is about 0.5 g/cm$^3$.

10. The method according to claim 9 wherein said method further comprises subjecting the dampening roll cover to dry heat sufficient to render said polyvinylalcohol fibers and resin insoluble.

11. The method according to claim 1 further comprising the step of grinding the surface of the dampening roll cover product of said method to provide a flat surface thereon.

12. The method according to claim 1 further comprising the step of mounting the dampening roll cover on a dampening roll mandrel, and then further shrinking said cover to the extent of at least about 10% to secure said dampening roll cover to said mandrel.

* * * * *